(No Model.) 3 Sheets—Sheet 1.

C. H. ACKERMAN.
ICE CREAM FREEZER.

No. 586,538. Patented July 20, 1897.

Witnesses:
F. A. Otto
H. R. Clough

Inventor
Charles H. Ackerman
By Erwin Wheeler & Wheeler
Attorneys.

THE NORRIS PETERS CO., PHOTO-LITHO., WASHINGTON, D. C.

(No Model.)  3 Sheets—Sheet 2.

C. H. ACKERMAN.
ICE CREAM FREEZER.

No. 586,538.  Patented July 20, 1897.

Witnesses:
F. A. Otto
H. R. Clough

Inventor
Charles H. Ackerman
By Erwin Wheeler & Wheeler
Attorneys.

THE NORRIS PETERS CO., PHOTO-LITHO., WASHINGTON, D. C.

(No Model.) 3 Sheets—Sheet 3.
C. H. ACKERMAN.
ICE CREAM FREEZER.
No. 586,538. Patented July 20, 1897.
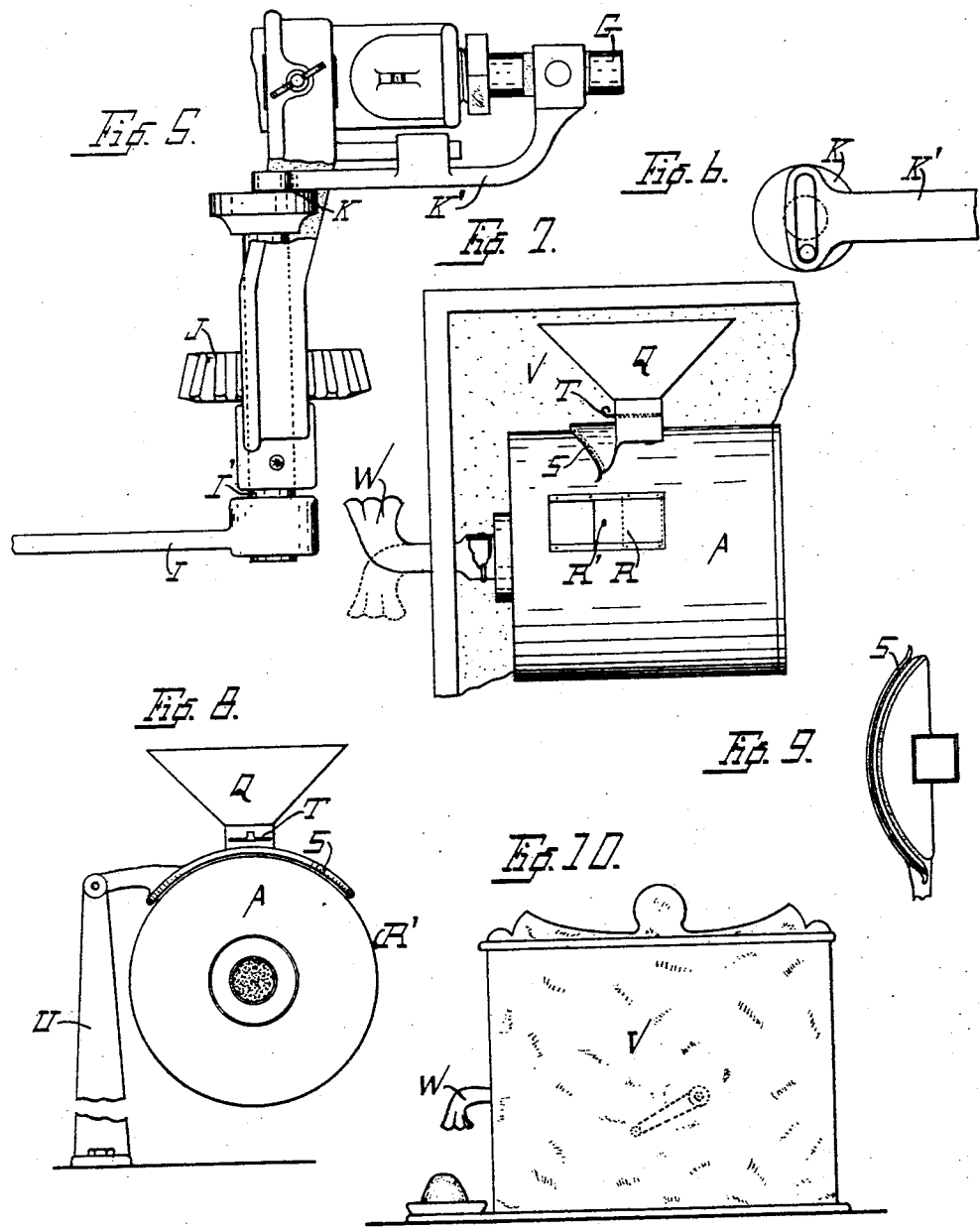
Witnesses.
T. A. Otto.
H. R. Clough
Inventor
Charles H. Ackerman
By Erwin Wheeler & Wheeler
Attorneys.

UNITED STATES PATENT OFFICE.

CHARLES H. ACKERMAN, OF WAUPUN, WISCONSIN.

ICE-CREAM FREEZER.

SPECIFICATION forming part of Letters Patent No. 586,538, dated July 20, 1897.

Application filed June 16, 1896. Serial No. 595,739. (No model.)

*To all whom it may concern:*

Be it known that I, CHARLES H. ACKERMAN, a citizen of the United States, residing at Waupun, in the county of Fond du Lac and State of Wisconsin, have invented new and useful Improvements in Ice-Cream Freezers, of which the following is a specification.

My invention relates to improvements in that class of ice-cream freezers known as "instantaneous" in which the cream is frozen while being forced or conveyed through a refrigerating-chamber.

The objects of my invention are, first, to render the refrigeration more effective by increasing the contact of the freezing mixture with the cream-tube; second, to provide means for thoroughly working or stirring the cream while it is being frozen; third, to provide means for feeding the cream either constantly or intermittently to the cream or freezing tube, and, fourth, to provide for intermittently feeding the freezing mixture to the ice-chamber.

In the following description reference is had to the accompanying drawings, in which—

Figure 1:
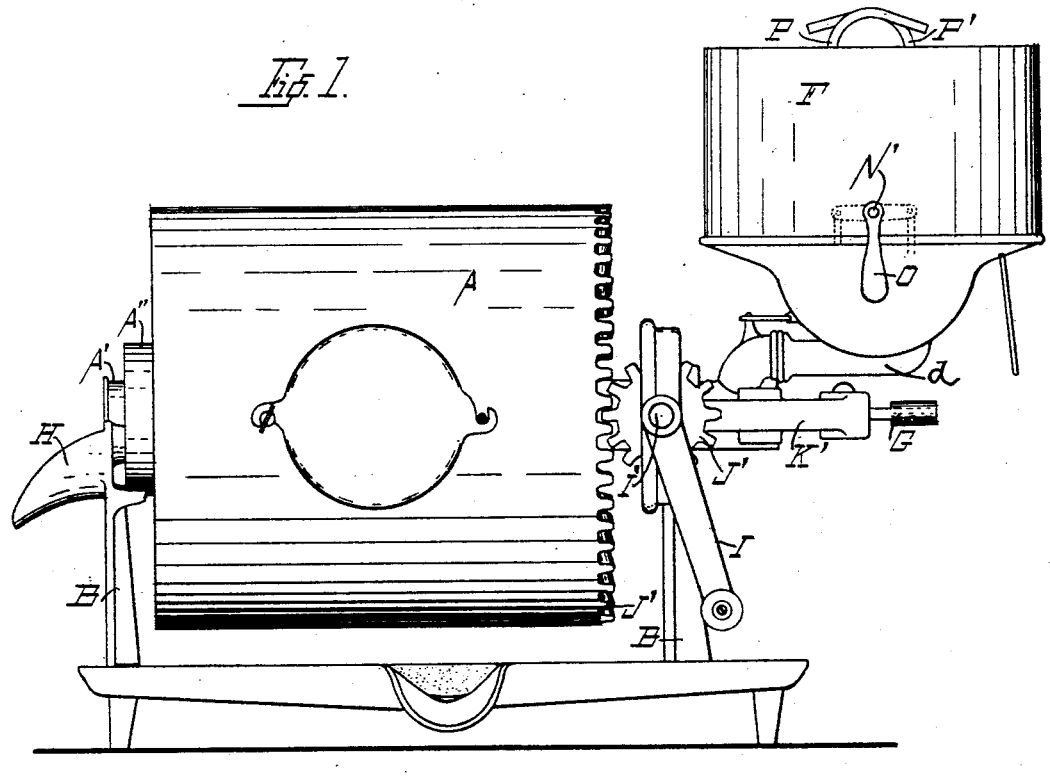
Figure 2:
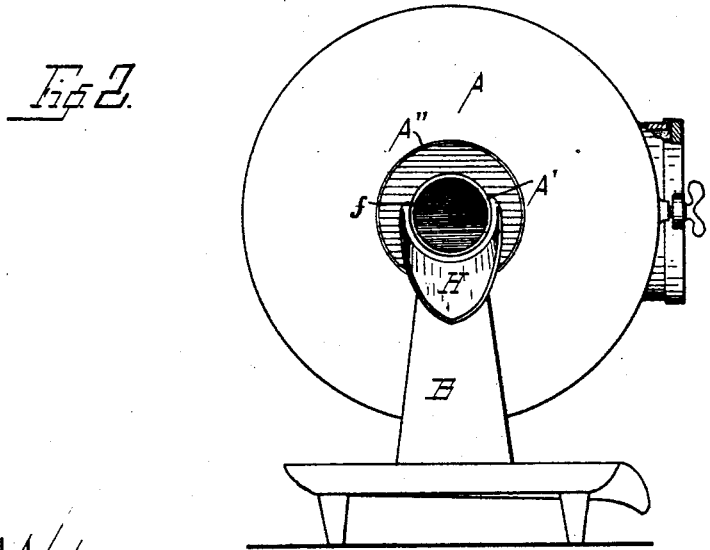
Figure 3:
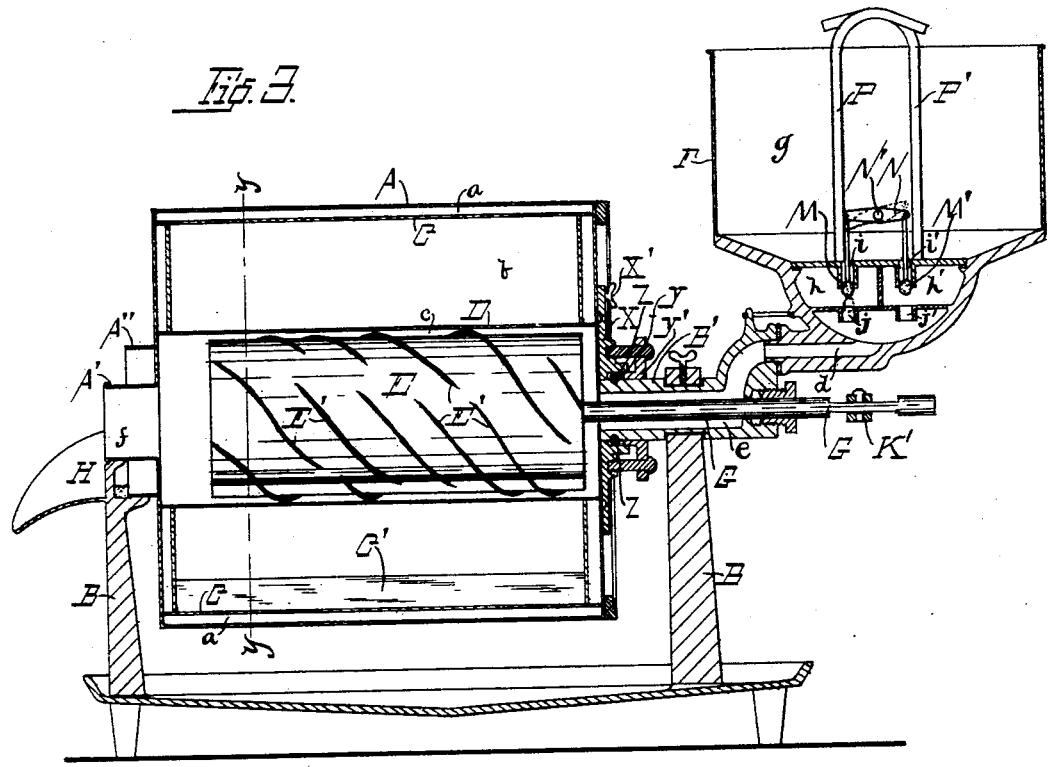
Figure 4:
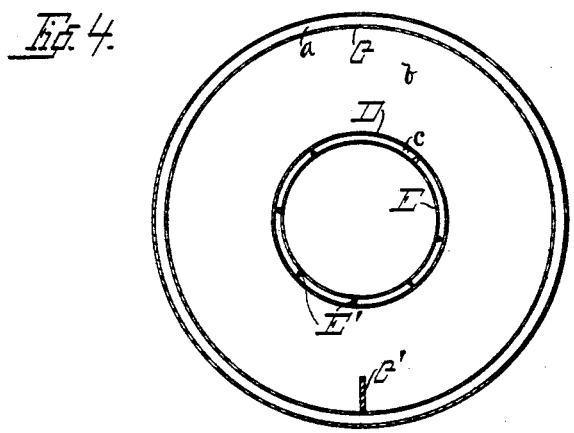

Figure 1 is a side view of my invention as it appears when removed from its inclosing cabinet. Fig. 2 is a view of the discharge end. Fig. 3 is a central longitudinal section view of the several chambers, showing the spiral conveyer as it is located in the interior. Fig. 4 is a cross-section view drawn on the line $y\,y$ of Fig. 3. Fig. 5 is a detail top view of the actuating mechanism with the cream-storage chamber removed. Fig. 6 is a side view of the eccentric for communicating motion to the conveyer, looking toward the actuating-handle. Fig. 7 is a side view of a portion of a cabinet with my freezer located therein, showing a modified form of cover for the latter and the hopper for feeding ice to the ice-chamber. Fig. 8 is an end view of the same with the cabinet removed. Fig. 9 is a view of the under side of the guide for opening and closing the form of cover shown in Fig. 7. Fig. 10 is a side view of the cabinet.

Like parts are identified by the same reference-letters throughout the several views.

A rotary shell A is supported axially upon standards B and provided with interior cylindrical partitions C and D, which subdivide the interior of the shell into an air-chamber $a$, ice-chamber $b$, and cream-chamber $c$, the latter being nearly filled by a conveyer-cylinder E, provided with broken screw-flanges E'. C' is an interior flange adapted to prevent the ice and salt from slipping in the chamber. The cream is fed into the cream-chamber from a storage-chamber F through the ducts $d$ and $e$, the latter being located around the axial support G of the conveyer-cylinder E. The frozen cream is discharged through a duct $f$, formed by a tube A' in the trunnion A'' at the rear end of the shell A, and delivered into any suitable dish or receptacle by means of a spout H.

A rotary motion is communicated to the shell A from the manually-operated crank I through the crank-shaft I' and the gear-wheels J and J', and a reciprocal motion is communicated to the conveyer E from the crank I through the crank-shaft I', disk K, provided with an eccentric-pin, arm K', and axis G. It is thus seen that the ice and salt or other freezing mixture is continually shaken up and made to press upon all sides of the partition D and that the cream is forced by the conveyer in an annular film through the chamber $c$, it being frozen by contact with the inner surface of the partition D and forced to the discharge end by the screw-flanges E' of the conveyer E, the cream being not only forced against the screw-flanges by the rotation of the partition D, and thereby crowded toward the discharge end, but also pushed longitudinally by the reciprocal movement of the cylinder.

The object of forming the conveyer with sectional screw-flanges is to render the movement of the cream intermittent, thus giving it time to freeze and also causing it to be more thoroughly worked before reaching the outlet.

I attach great importance to the fact that the ice-chamber is made to revolve about the conveyer, as the ice is thereby kept packed against the cream-chamber on all sides and the refrigeration rendered much more rapid, also to the peculiar construction of the conveyer, in that it is provided with the broken or sectional screw-flanges and given a reciprocal longitudinal movement, as a much finer grade of cream is thus produced than by any other method.

The remaining portion of my invention consists in certain specific details of construction which I have found convenient and useful, but which may, if desired, be dispensed with altogether without altering the construction of the freezer itself. Thus I have provided the storage-chamber F with an upper compartment g and two lower compartments h and h', respectively, communicating with the upper compartment through openings i and i', and with the duct d, through openings j and j'.

M and M' are valves suspended from an arm N of a rocking spindle N' and arranged to close both openings i and i' simultaneously, as shown in Fig. 3, or to close one of said openings and one of the lower openings j j' alternately, as indicated by dotted lines in said figure. By this arrangement I am able to measure the cream into the freezer as the same is ordered, while the freezer remains in continuous operation, or can temporarily close it off altogether, when desired. O is a lever for operating the spindle N', and P P' are tubes for admitting air into the compartments h and h'.

In Figs. 7 to 10, inclusive, I have illustrated means for feeding the freezing mixture into the ice-chamber, the mixture being stored in a hopper Q and the shell A being provided with an opening leading into the ice-chamber and normally closed by a sliding shutter R. The shutter R is provided with an upward-projecting pin R', which is adapted to engage in an eccentric guide S, attached to the hopper. The movement of the pin in the guide causes the shutter to open underneath the hopper, thus admitting the ice to the interior of the shell A, and to close again as the rotation of the shell carries the shutter past the hopper-outlet.

T is a slide adapted to close off the hopper-outlet when it is desired to stop the feeding of the ice, and U is a standard for supporting both the hopper and the guide.

V is a cabinet within which the entire machine is located, and W is a reversible bell-shaped discharge-spout arranged to convey the frozen cream downwardly into receiving-dishes or to be reversed or turned upwardly at the option of the user to form a cup adapted to retain the cream for use in connection with a soda-water fountain, thus avoiding the use of an extra receptacle, in which the cream would melt much faster than when left in the upturned end of the discharge-spout.

X is a removable end plate held to the shell by thumb-screws X' and adapted to permit the removal of the conveyer for cleaning the interior parts.

The packing Y is inserted between the bearing-sleeve Y' and the inner end of the plate X, thus forming a water-tight bearing around the stationary supporting-tube B'.

Having thus described my invention, what I claim as new, and desire to secure by Letters Patent, is—

1. An ice-cream freezer, consisting in the combination of a rotary ice-chamber provided with a central tubular opening therethrough, a cylindrical conveyer located therein and provided with sectional screw-flanges, means for feeding cream into the space between said conveyer and the walls of said tubular opening, a crank and suitable gearing for rotating said ice-chamber and connections adapted to communicate a reciprocal movement to the conveyer from the operating mechanism of the ice-chamber, substantially as described.

2. An ice-cream freezer, consisting in the combination of a rotary ice-chamber provided with a central tubular opening therethrough, a cylindrical conveyer located therein and provided with screw-flanges, means for feeding cream into the space between said conveyer and the walls of said opening, a manually-operated crank and suitable gearing for imparting motion to said ice-chamber, and connections adapted to communicate motion from said crank to the conveyer and cause the latter to reciprocate within the tubular opening, substantially as described.

3. An ice-cream freezer, consisting in the combination of a rotary ice-chamber provided with a central tubular opening therethrough, a cylindrical reciprocating conveyer located therein and provided with screw-flanges, a cream-storage chamber and ducts leading from said storage-chamber and discharging along the axis of the conveyer into the space between the conveyer and the walls of the tubular opening in the ice-chamber, substantially as described.

4. An ice-cream freezer, consisting in the combination of a rotary shell divided by cylindrical partitions into a tubular cream-chamber, an annular ice-chamber, and an air-chamber surrounding the ice-chamber, together with a cylindrical reciprocating conveyer located in the cream-chamber, and means for actuating the shell and conveyer, substantially as described.

5. An ice-cream freezer, consisting in the combination of a rotary shell divided by a cylindrical partition into a tubular cream-chamber and an annular ice-chamber, with a cylindrical reciprocating conveyer located in the cream-chamber, an interior longitudinally-disposed flange located in the ice-chamber, and means for actuating the shell and conveyer, substantially as described.

6. In an ice-cream freezer, a cream-storage chamber, comprising an upper chamber and two measuring-chambers communicating therewith, said measuring-chambers being provided with air-inlet tubes and oppositely-disposed inlets and outlets, with double-faced valves adapted to interchangeably close the inlets and outlets, and connections for causing said valves to simultaneously alternate in position in their respective chambers, whereby the chambers are adapted to discharge their contents alternately into the freezer, substantially as described.

7. In an ice-cream freezer, an automatic ice-feed, consisting in the combination with the rotary shell provided with a sliding shutter having an upward-projecting pin, an ice-retaining hopper supported above said shell and provided with an eccentric guide adapted to be engaged by said pin, for opening and closing said shutter, substantially as described.

8. In an ice-cream freezer, a reversible bell-shaped discharge-spout adapted to serve as a spout to convey the frozen cream into receiving-dishes, when turned downwardly, and as a cream-retaining cup when turned upwardly, substantially as described.

In testimony whereof I affix my signature in the presence of two witnesses.

CHARLES H. ACKERMAN.

Witnesses:
L. C. WHEELER,
E. J. PATTERSON.